US010464233B2

(12) United States Patent
Yeo et al.

(10) Patent No.: US 10,464,233 B2
(45) Date of Patent: Nov. 5, 2019

(54) EJECTOR CAPABLE OF BEING PREHEATED, INJECTION MOLD HAVING THE EJECTOR, AND METHOD OF MANUFACTURING MOLDED PART USING THE INJECTION MOLD

(71) Applicant: KOREA INSTITUTE OF ENERGY RESEARCH, Daejeon (KR)

(72) Inventors: Jeong-Gu Yeo, Daejeon (KR); Young-Hwan Kim, Daejeon (KR); Jin-seok Lee, Daejeon (KR); SeungCheol Yang, Jeju-si (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 574 days.

(21) Appl. No.: 15/165,722

(22) Filed: May 26, 2016

(65) Prior Publication Data

US 2016/0346954 A1 Dec. 1, 2016

(30) Foreign Application Priority Data

May 29, 2015 (KR) .................. 10-2015-0076560

(51) Int. Cl.
*B28B 7/10* (2006.01)
*B28B 1/24* (2006.01)
*B29C 45/78* (2006.01)
*B29C 45/73* (2006.01)
*B29C 45/40* (2006.01)
*B29C 45/27* (2006.01)

(52) U.S. Cl.
CPC .................. *B28B 7/10* (2013.01); *B28B 1/24* (2013.01); *B29C 45/401* (2013.01); *B29C 45/73* (2013.01); *B29C 45/7337* (2013.01); *B29C 45/78* (2013.01); *B29C 2045/2741* (2013.01); *B29C 2045/7393* (2013.01)

(58) Field of Classification Search
CPC .... B28B 7/10; B28B 7/42; B28B 1/24; B29C 45/73; B29C 45/7337; B29C 45/78; B29C 45/401; B29C 2045/2741; B29C 2045/7221; B29C 2045/7393
See application file for complete search history.

(56) References Cited

U.S. PATENT DOCUMENTS 2,306,316 A * 12/1942 Marsh ..................... B29C 45/26
425/547
5,068,065 A * 11/1991 Maus ..................... B29C 45/263
264/1.33
(Continued)

FOREIGN PATENT DOCUMENTS

JP 2000-135727 A 5/2000
JP 2004-074619 A 3/2004
JP 2010-000784 A 1/2010
(Continued)

*Primary Examiner* — Xiao S Zhao
*Assistant Examiner* — Ninh V Le
(74) *Attorney, Agent, or Firm* — Sughrue Mion, PLLC

(57) ABSTRACT

Disclosed is an injection mold. The injection mold includes a mold set having n molds (n is a natural number of ≥2) defining a cavity for injection molding a green body, and at least one ejector provided on at least one of the n molds to separate an injection-molded part from the mold set. The ejector is provided with a first heater capable of heating the mold set to a first temperature.

9 Claims, 5 Drawing Sheets

(56) References Cited

U.S. PATENT DOCUMENTS

| | | | |
|---|---|---|---|
| 6,290,882 B1 * | 9/2001 | Maus | B29C 45/0025 |
| | | | 264/2.2 |
| 2009/0212464 A1 * | 8/2009 | Kang | B29C 45/73 |
| | | | 264/328.14 |

FOREIGN PATENT DOCUMENTS

| | | |
|---|---|---|
| JP | 2010167656 A | 8/2010 |
| KR | 10-2009-0106987 A | 10/2009 |
| KR | 10-1046078 B1 | 7/2011 |
| KR | 1020110106190 A | 9/2011 |
| KR | 10-2012-0126138 | * 11/2012 |
| KR | 10-2012-0126138 A | 11/2012 |
| KR | 1 0-1 2781 63 B1 | 6/2013 |

* cited by examiner

EJECTOR CAPABLE OF BEING PREHEATED, INJECTION MOLD HAVING THE EJECTOR, AND METHOD OF MANUFACTURING MOLDED PART USING THE INJECTION MOLD

BACKGROUND OF THE INVENTION

Field of the Invention

The present invention relates generally to an ejector capable of being preheated, an injection mold including the ejector, and a method of manufacturing an injection-molded part using the injection mold and, more particularly, to an ejector that is able to be preheated, an injection mold whose internal temperature is precisely controlled using the preheated ejector, and a method of manufacturing an injection-molded part using the injection mold.

Description of the Related Art

Generally, during an injection molding process by an injection molding machine, if a temperature of a mold is low, there is a risk of generating defective factors such as increased viscosity, degraded fluidity, incomplete injection of a feedstock into the mold, occurrence of a weld line, a fault in the gloss on a surface of an injection-molded part, or the like. To solve this problem, it is required to increase the temperature of the mold so that the flow resistance and the residual stress of a feedstock are reduced, thereby removing the defective factors of an injection-molded part. In the meantime, after the mold is filled with a feedstock, it is preferred that the mold be rapidly cooled to shorten a cycle of the injection process. Accordingly, a currently available mold needs a temperature regulator to rapidly increase or decrease a temperature of the mold.

A melting point of a binder system in a feedstock for the ceramic injection molding is about 60° C. to 230° C. Therefore, a temperature of a nozzle of an injector containing the feedstock is set to about 70° C. to 250° C. in order to melt the feedstock. If an internal space for injection molding (also referred to as a cavity) in a mold set has low temperature, the feedstock is rapidly solidified during injection, causing an injection-molded part to be defective. To prevent this problem, a temperature of a mold should be set to a proper range according to the melting point of the feedstock. In a conventional ceramic injection molding, however, a temperature of a mold is controlled by a heater installed outside of the mold, so it is difficult to precisely control a temperature of the molding space affecting injection quality of an injection-molded part.

SUMMARY OF THE INVENTION

Accordingly, the present invention has been made keeping in mind the above problems occurring in the related art, and the present invention is intended to propose an ejector capable of being preheated by a heater installed therein thereby to precisely control an internal temperature of a mold, an injection mold having the ejector, and a method of manufacturing an injection-molded part using the injection mold.

Objects of the present invention are not limited to those set forth in the foregoing description, and other objects may be apparent to a person skilled in the art from the following description.

In order to achieve the above object, according to a first aspect of the present invention, there is provided an injection mold including: a mold set having n molds (n is a natural number of ≥2) defining a cavity for injection molding a green body; and at least one ejector provided on at least one of the n molds to separate an injection-molded part from the mold set, wherein the ejector is provided with a first heater capable of heating up the mold set to a first temperature.

Here, at least one of the n molds may be provided with a second heater capable of heating up the mold set to a second temperature.

Here, the ejector may be provided with a first temperature sensor to measure a temperature of a contact surface of the ejector and the cavity.

Here, at least one of the n molds may be provided with a second temperature sensor to measure a temperature of a contact surface of the mold and the cavity.

Further, although not specifically limited, the ejector may be configured as the first heater itself.

Further, the injection mold may further include a hollow sleeve tube surrounding the ejector, wherein the sleeve tube may contain a heat transfer medium to transfer heat generated from the first heater to the molds.

Here, the first heater may be formed from a resistive heating body including a metallic heating body and a non-metallic heating body. Preferably, the first heater may be formed from the metallic heating body composed of nichrome.

According to a second aspect of the present invention, there is provided an ejector including a first heater, wherein the ejector is provided on at least one of n molds (n is a natural number of ≥2) of a mold set to separate an injection-molded part from the mold set, the n molds defining a cavity for injection molding a green body, wherein the first heater is capable of heating up the mold set to a first temperature.

Here, the ejector may be provided with a first temperature sensor to measure a temperature of a contact surface of the ejector and the cavity.

According to a third aspect of the present invention, there is provided a method of manufacturing an injection-molded part using an injection mold, wherein the injection mold includes: a mold set having n molds (n is a natural number of ≥2) defining a cavity for injection molding an green body; and an ejector provided on at least one of the n molds to separate an injection-molded part from the mold set, wherein the ejector is provided with a first heater capable of heating up the mold set to a first temperature, the method including: (a) heating up the mold set to a second temperature; (b) heating up the mold set to the first temperature; (c) injecting a feedstock into the cavity; and (d) removing the injection-molded part from the injection mold.

Here, the step (a) may be carried out by a second heater provided in at least one of the n molds.

Embodiments disclosed in the present invention may have following effects. However, since this is not meant that disclosed embodiments each have all of the effects, it should not be construed that the scope of disclosed technology is limited thereto.

In the ceramic injection mold according to the present invention, an internal temperature of the mold can be precisely controlled using the ejector having the heater, thereby more effectively preventing defects of an injection-molded part generated due to a difference in temperature between the inside of the mold and a feedstock. Further, during heating of the inside of the mold using the ejector heater along with preheating using the heater installed outside of the mold, a heat loss as well as a load of the ejector heater can be reduced.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

A description of a disclosed technology is merely embodiments for the description of structures and functions of the disclosed technology, so it should not be construed that the scope of the disclosed technology is limited to the description of the embodiments. That is, since the embodiments may be diversely modified and have a variety of forms, the scope of the disclosed technology should be construed as including equivalents capable of implementing technical spirits of the present invention.

In the meantime, the meanings of terms used herein should be understood as follows. Terms 'first', 'second', or the like are used to distinguish one element from other elements, so the scope of the present invention should not be limited to the terms themselves. For example, a first element may be referred to as a second element, or vice versa.

The expression that one element is connected to other element should be understood that one element may be connected to other element in a direct connection method or with a further element interposed therebetween.

In the ceramic injection molding, a melting point of a feedstock injected into an injection mold ranges from about 60° C. to about 230° C. according to the binder system (which may include one or more kinds of binders), and a temperature of a nozzle of an injector is set to a temperature range of about 70° C. to 250° C. that is slightly higher than the melting point of the binder. If an internal space for injection molding (also referred to as a cavity) in a mold has low temperature, the feedstock is rapidly solidified during injection, causing an injection-molded part to be defective. To prevent this problem, a temperature of a mold should be set to a proper range according to the temperature of the feedstock. However, the ceramic injection mold does not have its own heating function.

In a conventional configuration to control the temperature of a mold to a proper range according to the temperature of the feedstock, an external heat source such as a heating band is installed on the outside of the mold. The ceramic injection mold has a relatively thick thickness in order to resist a clamping force of 15 tons or more applied during injection of a feedstock. Thus, due to heat capacity according to mold volume, a time delay may occur when heat generated from the external heat source is transferred to the cavity in which the feedstock is contained. Further, because of a temperature difference in a mold occurring due to an internal structure and a shape of the mold, it is difficult to shorten a time to preheat the mold using the conventional mold-heating method.

The present invention is proposed to solve these problems, and thus provides a ceramic injection mold in which an ejector is equipped with a heater to allow even a portion adjoining to the cavity to heat the mold, providing shortened preheating time and homogeneous mold-heating and therefore improving a quality of an injection-molded part.

Figure 1:
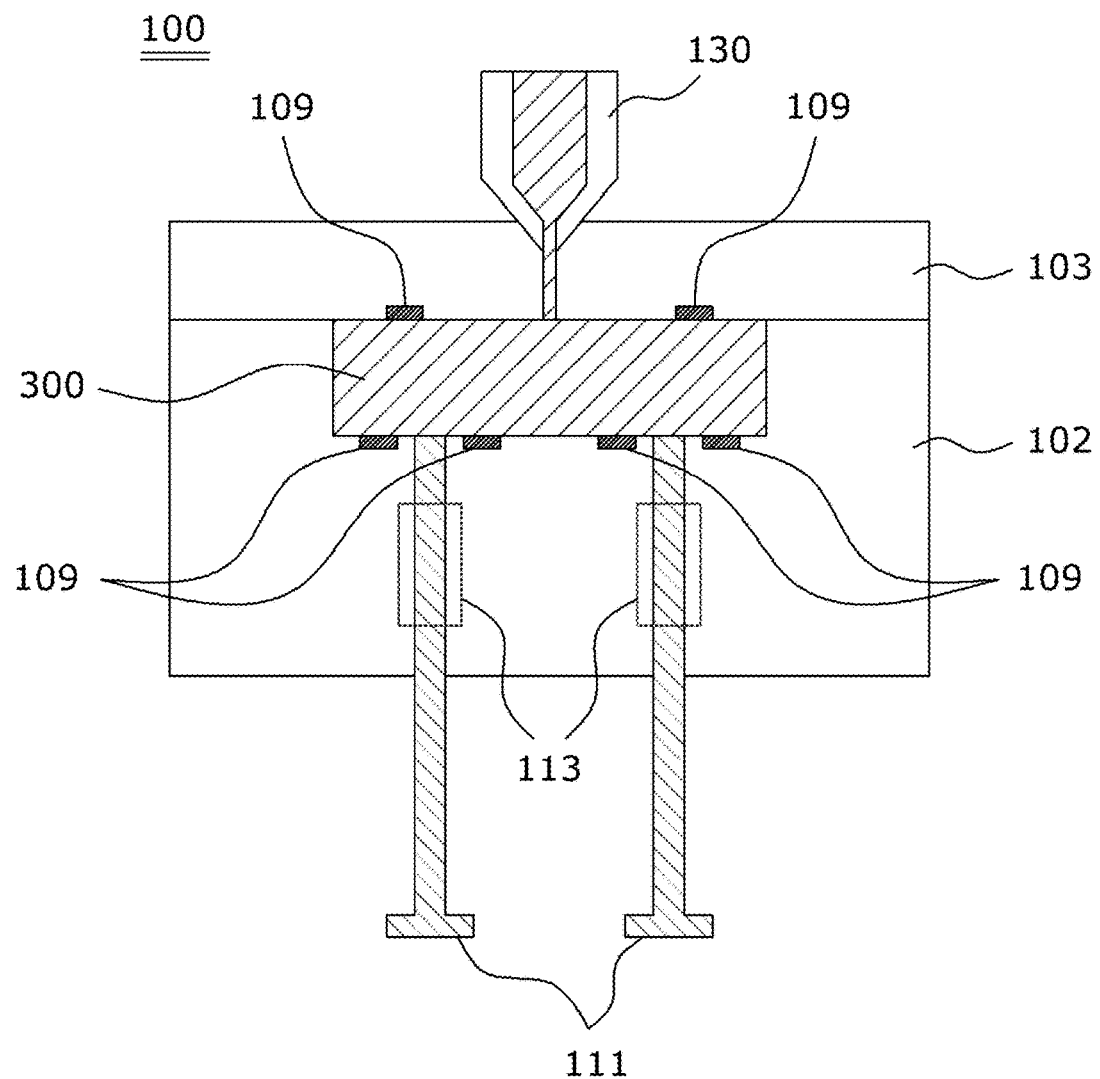
FIG. 1 is a cross-sectional view illustrating a ceramic injection mold having an ejector capable of being preheated according to embodiments of the present invention.

FIG. 1 is a cross-sectional view illustrating a ceramic injection mold having an ejector capable of being preheated according to embodiments of the present invention.

Referring to FIG. 1, the ceramic injection mold 100 includes a first mold 102, a second mold 103, ejectors 111, and sleeve tubes 113.

The ceramic injection mold 100 defines a cavity for injection molding of an injection-molded part by engagement of the first and second molds 102 and 103. Although it is illustrated that the cavity is defined by the molds 102 and 103 formed from two plates, this is merely for illustrative purpose, and a mold set may be formed from two or more plates according to a shape of an injection-molded ceramic part to be formed.

A feedstock is injected into the cavity defined by the engagement of the first and second molds 102 and 103. After completion of the injection, mold cooling and removal of the feedstock from the mold are sequentially carried out.

Prior to the injection of the feedstock, the cavity into which the feedstock is injected should be preheated to a proper temperature in order for smooth injection of the feedstock.

To this end, at least one of the first and second molds 102 and 103 includes a second heater (not shown). Specifically, the second heater may be installed on the outside of at least one of the first and second molds.

The second heater heats the cavity to a second temperature by heating the first and second molds 102 and 103. According to embodiments, the second heater properly adopts induction heating, resistive heating, fluid-circulation heating, or the like.

The ejector 111 is provided on any one of the first and second molds 102 and 103 so as to separate the injection-molded part 300 from the mold. Although it is illustrated that the ejector 111 is provided on the first mold 102 to push the injection-molded part 300 upwards from the bottom of the cavity, this is merely for convenience of explanation, and the shape and arrangement of the ejector 111 may be properly changed according to the shape of the injection-molded part 300 and the configuration of the mold set.

The ejector 111 includes a first heater (not shown) to heat the cavity to a first temperature by heating the first and second molds 102 and 103.

The first heater may be formed from a resistive heating body including a metallic or non-metallic heating body. Preferably, the first heater may be formed from the metallic heating body composed of nichrome. Although not specifically limited, the first heater may be formed from the non-metallic heating body such as a carbon heating body, a carbon fiber heating body, or the like.

The first heater heats up the cavity, which has been heated to the second temperature, to the first temperature.

The first temperature used herein is a temperature at which the feedstock injected into the cavity has a proper fluidity. The first temperature may preferably be set to 30% to 50% of the temperature of a cavity 130.

Further, the second temperature may preferably be set to 60% to 80% of the first temperature.

Although not specifically limited, the first heater may be provided on a surface of the ejector 111 or may constitute the ejector itself so that heat is transferred from the inside of the mold directly to the cavity, so it is possible to shorten a time delay in heating by an amount of a reduction in reducing the heat transfer path distance.

Further, such a reduction in the heat transfer path distance also provides an advantage of reducing a temperature difference that may occur on a surface of the cavity.

In addition, since the first heater starts heating the mold at the second temperature, the first heater has another advantage that a load of heating to the first temperature is reduced.

The first and second temperatures used herein are provided for illustrative purposes, and may be properly changed according to conditions such as kind of feedstocks and binders to be used, heating capability of the first heater provided on the ejector, the heat capacity and the shape of the mold.

In the meantime, the first mold 102 may be provided with a hollow sleeve tube 113 surrounding the ejector 111 for more efficient heat transfer from the ejector 111.

The sleeve tube 113 contains a heat transfer medium (fluid) therein to allow resistive heat generated from the first heater to be transferred to the first mold 102 more efficiently. When the first heater is formed from a resistive heating body, an increase in contact area with the first mold 102 by means of the heat transfer medium contained in the sleeve tube 113 is advantageous in heat transfer.

In embodiments, the sleeve tube 113 may be connected to an external cooling device. Thus, during cooling of the mold, a portion of the cavity that the ejector 111 contacts can be firstly cooled, so that, when the injection-molded part 300 is removed, the injection-molded part is prevented from being damaged by the ejector 111.

In the meantime, at least one of the first and second molds 102 and 103 is provided with a second temperature sensor 109 to measure a temperature of a surface thereof contacting the cavity.

In addition, the ejector 111 is provided with a first temperature sensor 110 to measure a temperature of a surface thereof contacting the cavity.

Figure 2:
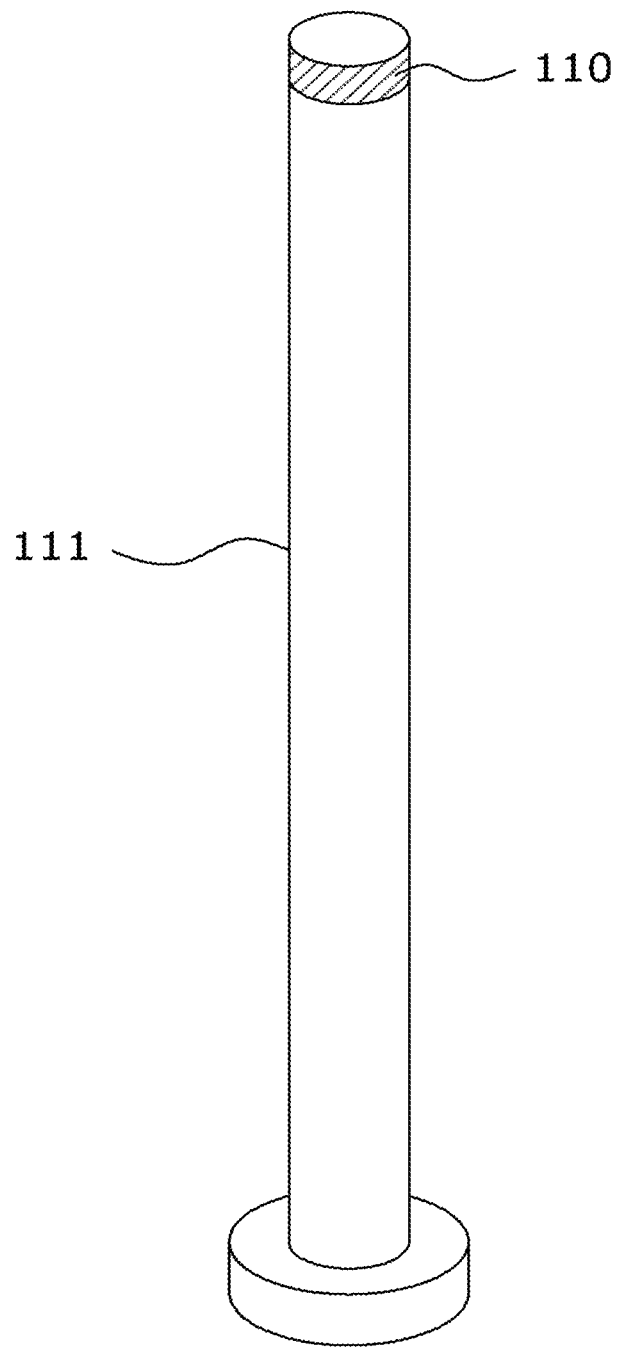
FIG. 2 is a perspective view illustrating an ejector according to embodiments of the present invention.

FIG. 2 is a perspective view illustrating an ejector according to embodiments of the present invention. As illustrated, it can be seen that the ejector 111 is provided with the first temperature sensor 110 at a portion of the ejector 111 that contacts the injection-molded part 300.

The first and second temperature sensors 110 and 109 may adopt a sensor using a variation in thermal resistance, but an infrared heat-measuring sensor may be adapted.

Figure 3:
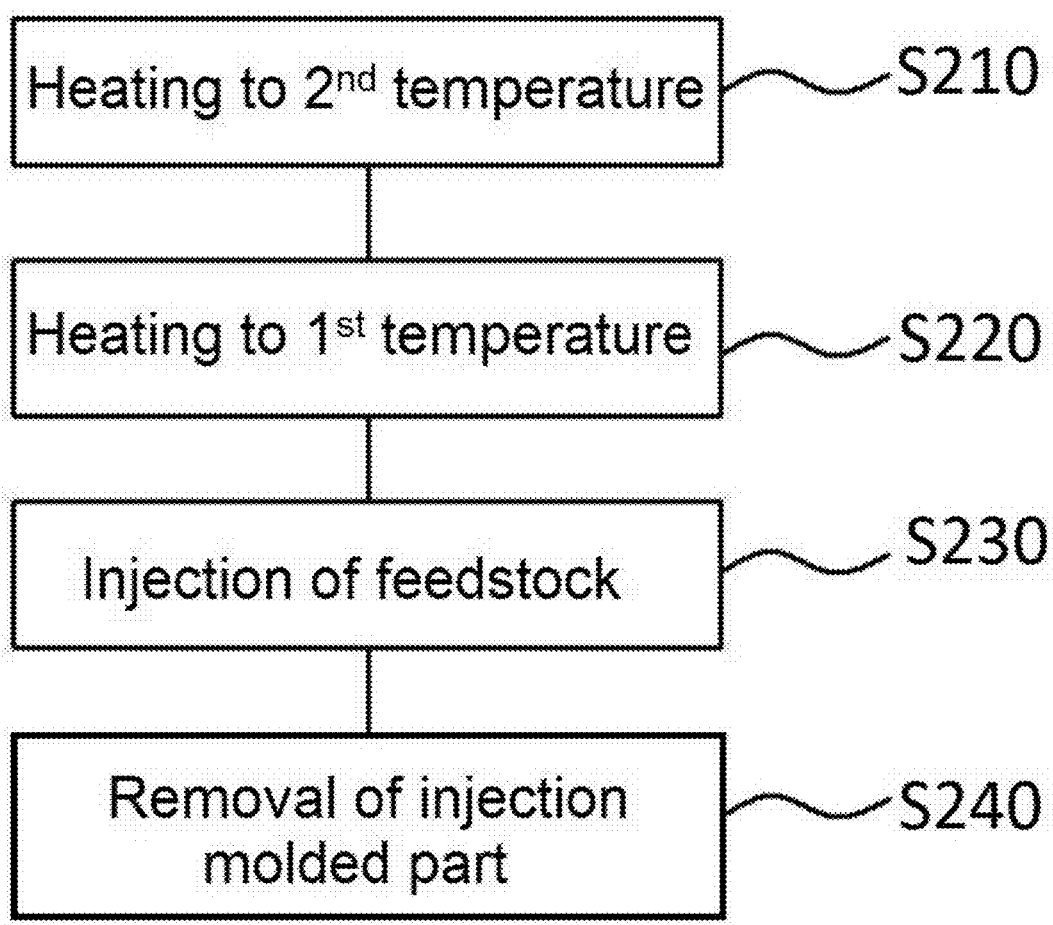
FIG. 3 is a flow chart illustrating a method of manufacturing a ceramic injection-molded part according to embodiments of the present invention.

FIG. 3 is a flow chart illustrating a method of manufacturing a ceramic injection-molded part according to embodiments of the present invention.

FIG. 3 shows an embodiment in which the ceramic injection mold shown in FIG. 1 is controlled in a time series manner, so the foregoing description of the configurations of the first mold 102, the second mold 103, the ejector 111, and the sleeve tube 113 may also be applied to this embodiment as it is.

The method of this embodiment includes: (a) heating a mold set to a second temperature (S210); (b) heating the mold set to a first temperature (S220); (c) injecting a feedstock into a cavity (S230); and (d) cooling the mold set (S240).

In S210, a second heater provided outside of at least one of the first and second molds 102 and 103 heats the mold set to the second temperature. The feedstock is composed of ceramics and binder, and has fluidity when the binder is melted. For example, when the feedstock has an injection temperature of 70° C., the second temperature may be set to 40° C. In addition, when the feedstock has an injection temperature of 110° C., the second temperature may be set to 70° C.

In S220, the first heater provided on the ejector 111 heats the mold set to the first temperature. That is, the first heater heats up the cavity, which has been heated to the second temperature, to the first temperature.

Here, the first temperature may preferably be a proper temperature selected according to the injection temperature of the feedstock. Since the first heater is provided on the ejector 111 so that heat is transferred directly to the cavity in the mold, it is possible to shorten a time delay in heating by an amount of a reduction in heat transfer path distance. In addition, such a reduction in heat transfer path provides an advantage of reducing a temperature difference that may occur on the surface of the cavity. Further, since the first heater starts heating of the mold at the second temperature, a load of carrying out heating to the first temperature is reduced, which is advantageous in heating control.

In S230, the feedstock is injected into the cavity in order to form the injection-molded part 300.

In S240, the mold is cooled and the injection-molded part 300 is removed from the mold so as to obtain the injection-molded part 300.

According to embodiments, the first mold 102 may be provided with the hollow sleeve tube 113 surrounding the ejector for more efficient heat transfer from the ejector 111. In addition, the sleeve tube 113 may be connected to an external cooling device. Thus, during cooling of the mold, a portion of the cavity that the ejector contacts is firstly cooled so that the injection-molded part 300 can be prevented from being damaged by the ejector during the removal of the injection-molded part.

Figure 4A:
FIGS. 4A and 4B are photographs illustrating an improvement in quality of a molded part when using the ejector according to embodiments of the present invention.
Figure 4B:
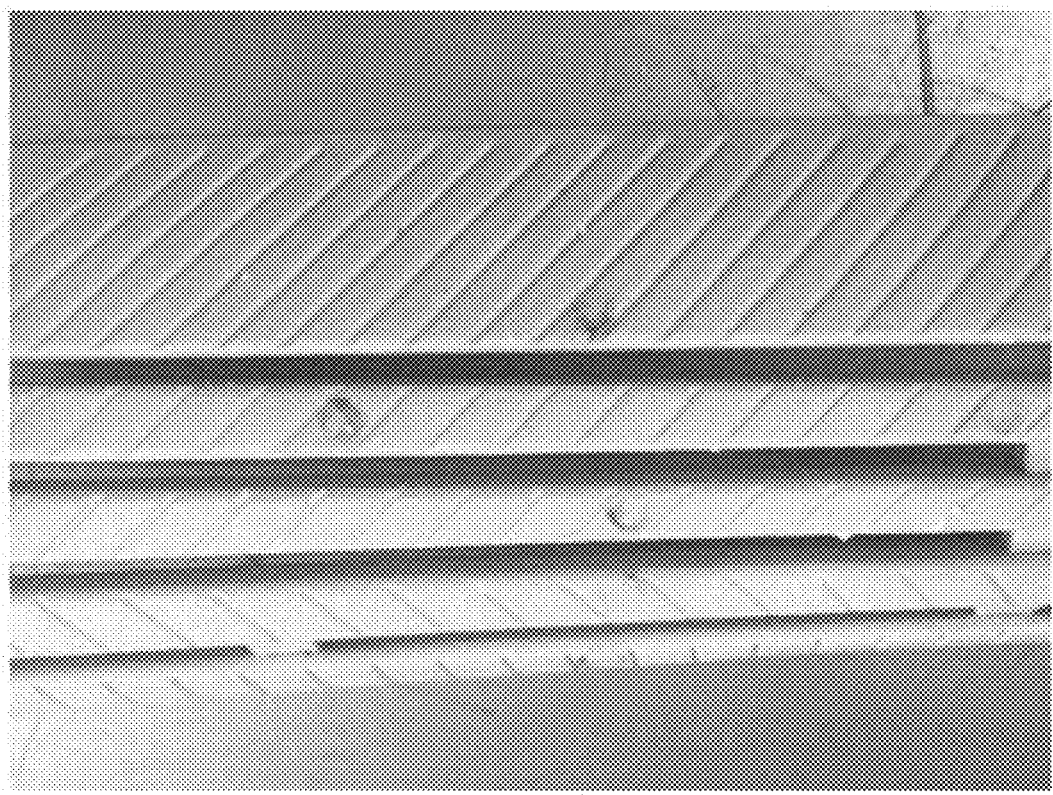

FIGS. 4A and 4B are photographs illustrating an improvement in quality of the injection-molded part when using the ejector according to embodiments of the present invention. FIG. 4A shows the case where the injection-molded part is damaged by the ejector during the removal of the injection-molded part, and FIG. 4B shows the molded part that is not damaged during the removal from the mold.

According to the ejector capable of being preheated, the injection mold having the ejector, and the method of manufacturing the injection-molded part using the injection mold, an internal temperature of the mold can be precisely controlled using the ejector having the heater, thereby more effectively preventing defects of an injection-molded part generated due to a difference in temperature between the inside of the mold and a feedstock.

While the disclosed method and device have been described with reference to embodiments illustrated in the drawings for easy understanding, this is performed merely for illustrative purposes and it will be understood by an ordinary skilled person in the art that those described embodiments may be changed into a variety of forms and other equivalent embodiments may also be possible. Therefore, the true technical scope of the disclosed technology should be defined by the scope of the accompanying claims.

What is claimed is:
1. An injection mold comprising:
a mold set having n molds (n is a natural number of ≥2) defining a cavity for injection molding a green body; and
at least one ejector provided on at least one of the n molds to separate an injection-molded part from the mold set, wherein the ejector is provided with a first heater capable of heating up the mold set to a first temperature,
wherein the injection mold further comprises a hollow sleeve tube surrounding the ejector, and wherein the hollow sleeve tube contains a heat transfer fluid medium to transfer heat generated from the first heater of the ejector to the molds to heat the molds.

2. The injection mold according to claim 1, wherein at least one of the n molds is provided with a second heater capable of heating up the mold set to a second temperature.

3. The injection mold according to claim 2, wherein at least one of the n molds is provided with a second temperature sensor to measure a temperature of a contact surface of the mold and the cavity.

4. The injection mold according to claim 1, wherein the ejector is provided with a first temperature sensor to measure a temperature of a contact surface of the ejector and the cavity.

5. The injection mold according to claim 1, wherein the ejector is configured as the first heater itself.

6. The injection mold according to claim 1, wherein the first heater is formed from a resistive heating body including a metallic heating body or a non-metallic heating body.

7. The injection mold according to claim 6, wherein the first heater is formed from the metallic heating body composed of nichrome.

8. A method of manufacturing an injection-molded part using the injection mold according to claim 1, the method comprising:
(a) heating up the mold set to a second temperature;
(b) heating up the mold set to the first temperature;
(c) injecting a feedstock into the cavity; and
(d) removing the injection-molded part from the injection mold.

9. The method according to claim 8, wherein the step (a) is carried out by a second heater provided in at least one of the n molds.

* * * * *